Dec. 18, 1951    W. C. B. SMITHUYSEN ET AL    2,579,021
PRODUCTION OF CHLORINATED ACETALDEHYDES
AND THEIR ACETAL DERIVATIVES
Filed July 1, 1947
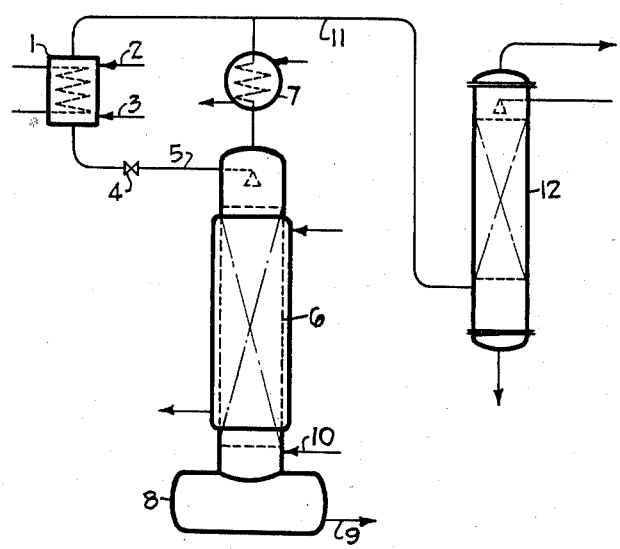
Fig. I
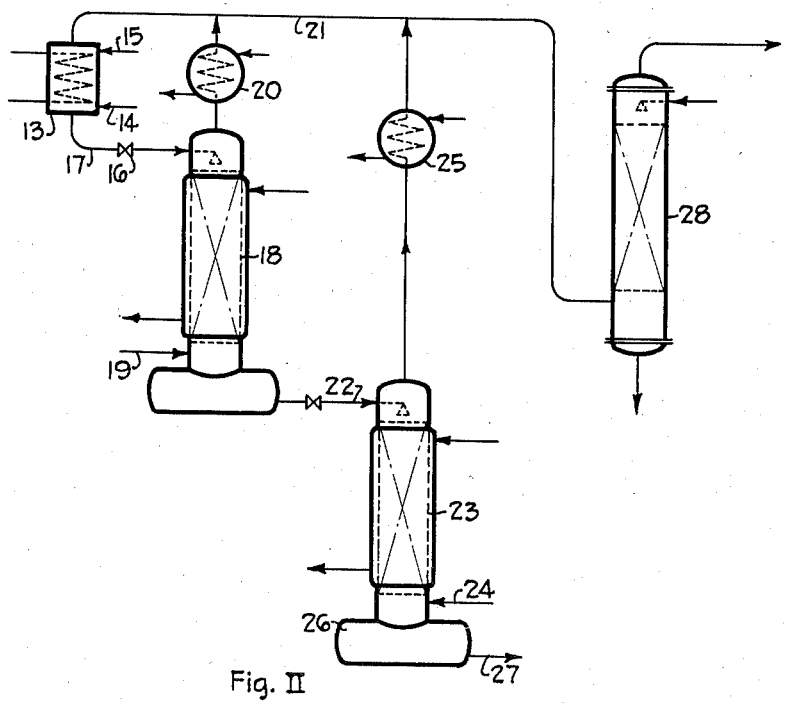
Fig. II
Inventor: Wilhelm Carel Brezesinka Smithuysen
Coenraad Daniel Frederik Eerbeek
By their Attorney:

Patented Dec. 18, 1951

2,579,021

UNITED STATES PATENT OFFICE 2,579,021

PRODUCTION OF CHLORINATED ACETALDEHYDES AND THEIR ACETAL DERIVATIVES

Wilhelm C. Brezesinska Smithuysen and Coenraad D. F. Eerbeek, Amsterdam, Netherlands, assignors to Shell Development Company, San Francisco, Calif., a corporation of Delaware Application July 1, 1947, Serial No. 758,458
In the Netherlands July 10, 1946

11 Claims. (Cl. 260—601)

This invention relates to a process for the production of chlorinated acetaldehydes and their acetal derivatives. More particularly the invention relates to a novel process for the production of dichloroacetaldehyde, trichloroacetaldehyde and their respective acetal derivatives by the direct chlorination of ethyl alcohol.

More specifically the invention provides a practical and highly economical method for the production, in a continuous manner, of high yields of substantially pure dichloroacetaldehyde, trichloroacetaldehyde and their respective acetal derivatives by the chlorination of ethyl alcohol, which comprises treating the ethyl alcohol at a relatively low temperature in the order of about 10° C. to about 35° C. with part of the required amount of chlorine, treating the resulting reaction mixture with a further quantity of chlorine at a more elevated temperature in the order of from about 80° C. to about 100° C. under such conditions that the components of the reaction mixture remain in contact with one another for only a relatively short period of time and the hydrogen chloride formed in the reaction is removed therefrom before it has sufficient time to react with the unconverted ethyl alcohol, recovering the resulting liquid reaction mixture and separating therefrom the desired chlorinated product.

Dichloroacetaldehyde and trichloroacetaldehyde are colorless liquids which are utilized for a great many industrial purposes. Trichloroacetaldehyde, better known in industry as chloral, has been used, for example, for many years in the field of medicine as a sleep inducing drug. Chloral is of particular importance at the present time in the production of valuable insecticides and fungicides. Dichloroacetaldehyde, trichloroacetaldehyde and their respective acetal derivatives are generally obtained by the well known method of treating ethyl alcohol with chlorine. This method for the production of the said compounds is illustrated below by the equation showing the production of trichloroacetaldehyde:

(1) 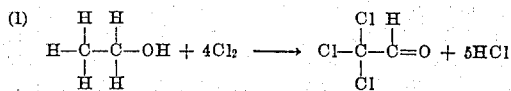

By varying the amount of chlorine the above-described reaction may be made to produce either trichloroacetaldehyde, dichloroacetaldehyde or the acetal derivatives of these two compounds. The formation of the acetal derivatives by this means is illustrated by the equation below showing the production of trichloroacetaldehyde hemiacetal:

(II) 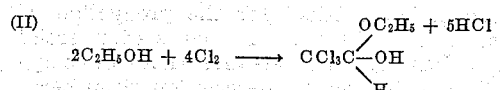

The expression "acetal derivatives" is used in a generic sense throughout the specification and claims to embrace both the hemi-acetal and acetal forms. When individual compounds are intended they will be referred to as a hemi-acetal or an acetal.

The procedure used heretofore for the production of the chlorinated acetaldehydes and their acetal derivatives by the above-described reactions is a batch-wise method comprising passing part of the chlorine at a relatively low temperature into ethyl alcohol until no more is absorbed, heating the resulting mixture and adding an additional quantity of chlorine at a more elevated temperature until the mixture has obtained a certain specific gravity, and subsequently separating out the desired products by a series of separation processes.

This known method for the preparation of the chlorinated acetaldehydes and their acetal derivatives by the chlorination of ethyl alcohol has, however, proved to be quite unsatisfactory. In general, the cost of producing the chlorinated acetaldehydes by this method has been so high as to render this process substantially useless as a commercial source for these products. As one defect the known method of preparation is extremely slow and tedious and the process is adapted only for operation in a batch-wise manner. The cold chlorination of the ethyl alcohol, for example, must be conducted in a separate container and continued in that separate batch until the reaction mixture has obtained a desired specific gravity. In addition the process results in a very low percentage transformation of ethyl alcohol to the chlorinated acetaldehydes as large amounts of the alcohol are diverted to the production of undesirable by-products. Furthermore, the presence of these by-products requires the use of additional purification processes before the chlorinated acetaldehydes may be obtained in the purity required in many of their industrial uses. Accordingly, the process provided by this invention permits a very economical commercial production of high yields of relatively pure chlorinated acetaldehydes, and is a material advance in the art.

It is object of the invention, therefore, to provide a practical and highly economical method for the production of chlorinated acetaldehydes and their acetal derivatives. It is a further object to provide a method for the production of trichloroacetaldehyde, dichloroacetaldehyde and their acetal derivatives by the chlorination of ethyl alcohol which may be, and is preferably, conducted in a continuous manner. It is a further object of the invention to provide a method for the production of trichloroacetaldehyde, dichloroacetaldehyde and their acetal derivatives from ethyl alcohol which enables a very high conversion of the alcohol to the desired chlorinated products. It is a further object of the invention to provide a method for the production of trichloroacetaldehyde, dichloroacetaldehyde and their acetal derivatives by the chlorination of ethyl alcohol which substantially eliminates the production of undesirable by-products and thus eliminates the necessity of using additional purification equipment in the preparation process. It is a further object to provide a simple and economical method for the production of chloral suitable for use on a large commercial scale. Other objects of the invention will be apparent from the detailed description given hereinafter.

It has now been discovered that these objects may be accomplished by the novel process of the invention which broadly comprises treating ethyl alcohol with a small amount of chlorine at a relatively low temperature, subjecting the resulting mixture to the action of a further quantity of chlorine at a more elevated temperature under such conditions that the components of the reaction remain in contact with one another for only a short period of time and the hydrogen chloride formed in the reaction is removed therefrom before it has sufficient time to enter into reaction with the unconverted ethyl alcohol, recovering the resulting liquid reaction mixture and separating therefrom the desired chlorinated products. This process of the invention is characterized by the highly desired economical features of (1) being conductable in a continuous manner so that all parts of the required apparatus are in use at all times and there will be produced a continuous flow of the desired compounds, (2) of providing an extremely high conversion of ethyl alcohol to the chlorinated acetaldehydes and their acetal derivatives and, (3) of providing the desired products free of undesirable by-products so that no additional purification processes need be employed to place the products in the form which they are needed for their industrial applications.

The novel process of the invention is based upon the discovery that the low yields of products obtained in the conversion of ethyl alcohol to the chlorinated acetaldehydes and their acetal derivatives by the previously known method was due largely to the production of ethyl chloride by the reaction of the formed hydrogen chloride with the unconverted ethyl alcohol during the high temperature chlorination step. It was further discovered that the combination of the hydrogen chloride with the alcohol was a much slower reaction than that concerned with the production of the chlorinated acetaldehydes and to eliminate the production of the undesirable ethyl chloride by-product it was only necessary to remove the hydrogen chloride formed in the reaction before it had sufficient time to react with the unconverted alcohol. It was found, for example, that in those cases where the hydrogen chloride remained in contact with reaction mixture for some time and the gas was allowed to escape only through the outlet of an ordinary reflux condenser, the yield of the chlorinated acetaldehydes amounted to only about 40% conversion of the ethyl alcohol with a great part of the remaining ethyl alcohol being converted to ethyl chloride. However, in those cases where special means were adapted to remove the hydrogen chloride from the reaction within a relatively short period after it was formed therein, the amount of conversion of ethyl alcohol to the chlorinated acetaldehydes amounted to as high as 95%.

Thus to achieve the high conversion of ethyl alcohol to the chlorinated acetaldehydes and eliminate the production of the undesirable by-products it is essential that the hydrogen chloride be removed from the high temperature phase chlorination step in sufficient time to prevent its reaction with the unconverted ethyl alcohol. The length of time in which the hydrogen chloride may remain in contact with the reaction mixture without undergoing a reaction with the unconverted ethyl alcohol contained therein will, of course, depend upon the different circumstances and may best be determined for each individual case. In general, the contact time between the chlorine and the alcohol should not vary over a relatively few seconds. The faster the hydrogen chloride is removed from the hot chlorination reaction, however, the more assured will be the desired high efficient results of the process. It is, therefore, preferred to remove the hydrogen chloride from the hot chlorination reaction zone substantially as fast as it is formed therein.

The removal of the hydrogen chloride from the hot chlorination zone before it has an opportunity to react with the unconverted ethyl alcohol may be accomplished by any suitable method. As a preferred embodiment it is accomplished in the present invention by conducting the hot chlorination step continuously in "countercurrent." By the expression "countercurrent" as used throughout the specification and claims is meant introducing the components of the reaction into the reaction vessel in such a manner that at their point of junction the direction of flow of one of the reaction components is opposite to that of the other component, e. g. at their point of junction one of the components is flowing downward while the other component is flowing upward. Under such conditions the reaction components will rapidly pass through one another and there will only be a relatively short period in which any reaction between them can take place.

To conduct the process of the invention by the preferred means of countercurrent contact, the ethyl alcohol is first treated in a separate reaction vessel in the cold with part of the required amount of chlorine. The products of this reaction are then taken to another reaction chamber which is maintained at the required high temperature. The reaction products of the cold chlorination are introduced into the upper part of this reaction vessel and the chlorine is introduced into the lower part of the vessel so that at the point of their junction the direction of flow of the chlorine will be opposite to that of the reaction products and there will be contact between the two components for only a relatively short period of time. The hydrogen chloride formed in the reaction will rise and be quickly separated from the reaction mixture which will descend and be collected in the bottom of the reaction vessel.

To prevent the loss of products due to the rapid volatilization of the reaction mixture when it is introduced into the hot chlorination chamber directly from the cold chlorination reaction vessel it has been found advisable in some cases to interpose another reaction chamber of intermediate temperature between the cold and hot chlorination reaction vessels. Thus if the final desired temperature to be employed in the final hot chlorination chamber is 90° C. another chamber may be interposed which is maintained at an intermediate temperature of, for example, 75° C. If this intermediate reaction vessel is to be employed in the process, however, the introduction of the chlorine and the reaction products of the cold chlorination should be in countercurrent in the manner described above, i. e. the reaction products should be introduced in the upper part of the vessel and the chlorine in the lower part of the reaction vessel so that the contact between the two components will be of relatively short duration and the hydrogen chloride will be removed rapidly from its contact with the unconverted alcohol.

To more clearly illustrate how the process of the invention may be accomplished Figure I has been attached to show more or less diagrammatically a typical arrangement of apparatus that may be used for the production of the desired chlorinated acetaldehydes and their acetal derivatives by the preferred method. Figure I is intended only as an illustration of one embodiment of the invention and should not be regarded as limiting the invention in any way. The apparatus shown in Figure I consists essentially of a reaction vessel 1, another reaction vessel 6, a retaining kettle 8 and a gas scrubber 12.

In the operation of the apparatus as shown in Figure I the first chlorination reaction takes place in reaction vessel 1 which is maintained at a relatively low temperature. Chlorine is introduced at the bottom of the reaction vessel through conduit 3 while the ethyl alcohol is introduced at the top of the vessel through conduit 2. The products obtained from this cold chlorination reaction are passed via conduit 5 provided with a regulating valve 4 into reaction vessel 6 which is maintained at a relatively high temperature. The reaction products of the cold chlorination step are introduced into reaction vessel 6 at the top of the column while the chlorine is introduced at the bottom of the reaction vessel through conduit 10. The hydrogen chloride formed during the reaction in vessel 6 rises to the top and is cooled at condenser 7 and drawn off through conduit 11 to the gas scrubber 12 where it is absorbed in water. The products of the hot chlorination reaction in vessel 6 are collected in retainer kettle 8 and drawn off as the final product through conduit 9.

Figure II illustrates more or less diagrammatically a typical arrangement of apparatus that may be used for the production of the desired compounds by the second embodiment of the invention, i. e. conducting the hot chlorination step in two distinct stages wherein the first stage is conducted at a lower temperature than that of the second. The apparatus shown in Figure II is substantially like that of Figure I with the exception that an additional hot chlorination reaction vessel has been interposed between the cold chlorination reaction vessel and the original hot chlorination reaction vessel.

In the operation of the apparatus as shown in Figure II the cold chlorination reaction vessel takes place in reaction vessel 13 which is maintained at a relatively low temperature. Chlorine is introduced at the bottom of the reaction vessel through conduit 14 while the ethyl alcohol is introduced at the top of the vessel through conduit 15. The products obtained from this reaction are passed via conduit 17 provided with a regulating valve 16 into reaction vessel 18 which is maintained at a temperature intermediate between that of the cold chlorination vessel and that of the final hot chlorination vessel. The products of the cold chlorination reaction are introduced into reaction vessel 18 at the top of the column while the chlorine is introduced at the bottom of the column through conduit 19. The hydrogen chloride formed during the reaction rises to the top of vesseel 18, is cooled at condenser 20 and then drawn off through conduit 21. The products of the reaction in vessel 18 are conducted through conduit 22 to reaction vessel 23 which is maintained at the final high temperature desired for the hot chlorination step. The products are introduced at the top of reaction vessel 23 while the final amount of required chlorine is introduced at the bottom of the reaction vessel through conduit 24. The hydrogen chloride formed during the reaction rises to the top of vessel 23, is cooled at condenser 25 and then drawn off through conduit 21 to the gas scrubber 28. The products of the hot chlorination reaction in vessel 23 are collected in retainer kettle 26 and drawn off as the final product through conduit 27.

The first step of the process of the invention comprises treating ethyl alcohol with chlorine at a relatively low temperature. The temperature employed in this reaction will, in general, be below 35° C., and preferably between about 10° C. and about 35° C. The exact temperature range employed in each particular case, however, will depend upon the means employed to remove the considerable amount of heat formed during the reaction. Cooling of the reaction vessel by means of a cold water jacket has proved to be the most practical and economical method so the temperatures obtained by the use of such a cooling process, i. e. temperatures ranging from about 20° C. to about 25° C. are the more preferred.

The amount of chlorine added to the ethyl alcohol in the cold chlorination reaction should, in general, be sufficient to saturate the alcohol solution. As the temperature of the alcohol solution is maintained at a relatively low level the amount of chlorine required for saturation will be only a very small amount, e. g. between about .1 to about .4 mol of chlorine per mol of alcohol. In most cases this amount will only be about 10% to about 20% of the theoretical amount required for the production of the desired compound. The exact amount of chlorine required for the saturation of the alcohol solution will vary with the temperature selected for the chlorination. When the preferred temperature range of 20° C. to 25° C. is used in the reaction the amount of chlorine needed for saturation of the alcohol is in most cases about .4 mol per mol of alcohol. In the production of trichloroacetaldehyde hemi-acetal this is about 20% of the required theoretical amount. Smaller amounts of chlorine than that required for saturation may be used in the reaction if desired but such small amounts, in general, do not produce as efficient results as when saturation of the alcohol has been obtained. Larger amounts than that required for saturation produce no additional effect and their use results only in loss of material.

The chlorine used in the process of the invention is preferably dry and free of oxygen and other impurities. The ethyl alcohol employed may be anhydrous or may contain small quantities of water. Ordinary alcohol of commerce of about 96% purity has produced exceptionally fine results and its use is, therefore, the more preferred.

Chlorination catalysts may be employed in the process if desired but their presence is not essential to the success of the process. In some cases catalysts such as ferric chloride have proved to be helpful in speeding up the reaction. Sources of energy such as diffused sunlight have also been found to have beneficial catalytic activity in the present process. If catalysts are to be used in the reactions they may be present in the reaction vessels or they may be added to the alcohol solution before it is introduced into the reaction. In the use of catalysts, such as ferric chloride, it is preferred to introduce the catalyst into the alcohol solution before the alcohol is added to the reaction zone. The amount of catalyst used will depend upon the specific nature of the catalyst and the desired rate of chlorination but in most cases the amount should not vary over 5% of the total weight of reactants.

The products resulting from the cold chlorination reaction will consist substantially of monochloroacetaldehyde, hydrogen chloride and unconverted ethyl alcohol. At the low temperatures employed in the reaction the formed hydrogen chloride reacts at an extremely low rate with the unconverted ethyl alcohol so that in this reaction there is little need to reduce the contact time between the chlorine and the ethyl alcohol. The cold chlorination reaction may, therefore, be conducted either in the known batch-wise manner or in the preferred manner described above for the hot chlorination reaction wherein the chlorine and reaction products are brought together in countercurrent. The numerous advantages of the latter method, however, make it the more preferred procedure to be used even in the cold chlorination reaction. When this preferred method is adapted to the cold chlorination reaction the alcohol is introduced at the top of the reaction vessel maintained at the low temperature, the chlorine is introduced at the bottom of the vessel and the gaseous hydrogen chloride evolved during the reaction is drawn off from the reaction mixture through the top of the vessel.

The second step of the process comprises treating the reaction mixture of the cold chlorination step with a further quantity of chlorine at an elevated temperature under such conditions that the hydrogen chloride formed in the reaction is removed therefrom before it has sufficient time to enter into reaction with the unconverted ethyl alcohol. The temperature range employed in this hot chlorination reaction will, in general vary between about 80° C. to about 100° C. Temperatures between about 90° C. and about 95° C. are usually the more preferred. In the event the hot chlorination step is to be conducted in two stages as described hereinabove, the temperature used in the first reaction vessel is usually of an intermediate range between about 60° C. to about 80° C., preferably between 60° C. and 70° C., and the second vessel is maintained at the top temperature range of 80° C. to about 100° C., preferably between about 90° C. and 95° C. Temperatures slightly higher than 100° C. may be used if desired but such temperatures in general add little to the efficiency of the reaction or the amount of the final yield.

The amount of chlorine added to the hot chlorination reaction will vary over a considerable range depending upon the amount of chlorine already added in the cold chlorination reaction and upon the type of final product desired. The chlorine supply is preferably adjusted in this hot chlorination reaction so that the final product is wholly or substantially obtained in one of the desired forms, i. e. in the form of dichloroacetaldehyde, trichloroacetaldehyde, dichloroacetaldehyde acetal or trichloroacetaldehyde acetal. The amount of chlorine to be added to the hot chlorination reaction may be readily arrived at by first determining from the appropriate equation the theoretical amount of chlorine required for the production of the desired compound and deducting therefrom the amount of chlorine already added in the cold chlorination reaction. Thus in arriving at the amount of chlorine to be added to the hot chlorination reaction in the production of trichloroacetaldehyde hemi-acetal it is determined from Equation II that 2 mols of chlorine should be added per mol of alcohol. Deduction of the .4 mol of chlorine added during the cold chlorination reaction leaves approximately 1.6 mols to be added during the hot chlorination phase.

To produce the free forms of the trichloroacetaldehyde and dichloroacetaldehyde requires appreciably larger quantities of chlorine than to produce their acetal derivatives. Thus, if the free form of the chlorinated acetaldehydes are the products desired it may be economically more feasible to produce the acetal derivative and then free the desired product from the said derivative by a procedure described hereinafter.

The removal of the hydrogen chloride from the hot chlorination reaction before it has an opportunity to react with the unconverted ethyl alcohol is preferably accomplished by conducting the hot chlorination reaction in continuous countercurrent as described hereinabove. By this preferred method the chlorine is introduced at the bottom of the vessel and ascends through the vessel. The reaction products of the cold chlorination reaction which are in the liquid form are introduced at the top of the vessel and descend through the vessel. With this arrangement the two components enter into reaction only for a short period in which they are in contact, their contact point being preferably somewhere in the middle of the reaction vessel. The hydrogen chloride formed in the reaction rises rapidly to the top of the vessel and is removed through a condenser. The other components of the reaction which comprise the liquid reaction mixture descend to the bottom of the vessel and are collected as the final product.

The vessel used in the preferred method of conducting the hot chlorination may be of any suitable construction which perimts the maintenance of the proper temperature, the proper mixture of the two components in countercurrents and a rapid removal of the formed hydrogen chloride from the reaction chamber. A glass lined metal tube surrounded by a steam jacket containing the proper inlet tubes and connected to a water cooled condenser at the top has provided very satisfactory for the operation of the process of the invention by the preferred method.

The liquid product obtained from the hot chlorination reaction will consist substantially of the desired chlorinated product and in some cases a small quantity of other constituents such as non-converted ethyl alcohol and any catalyst applied. The desired chlorinated product can be readily recovered therefrom in substantially pure form by any suitable means which comprises fractional distillation, extraction, and the like.

If the product obtained from the process of the invention is an acetal derivative and the free form of the chlorinated product is the one desired, the resulting mixture may be subjected to a further treatment to isolate the free form. This release of the chlorinated products from their respective acetal derivative may be accomplished by any suitable method. One such method comprises treating the mixture containing the acetal with concentrated sulfuric acid and recovering therefrom the free form of the chlorinated product by fractional distillation.

The above-described process of the invention may be conducted in a batch-wise, semi-continuous or continuous manner. The economical features of a continuous operation as discussed hereinabove make that manner of operation by far the more preferred. In a continuous operation of the process the ethyl alcohol and chlorine will be introduced continuously in the cold chlorination reaction vessel at the prescribed rate, the resulting products continuously conducted to the hot chlorination vessel and mixed in countercurrents with more chlorine introduced at the desired rate, the resulting products separated and any unconverted ethyl alcohol recovered can be recycled to the cold chlorination step.

The process of the invention described hereinabove is generally carried out under normal pressure, it may, however, also be effected wholly or partly under a pressure other than atmospheric. Thus it may under certain circumstances be of advantage to carry out the hot phase of the chlorination under a somewhat reduced pressure, a quicker discharge of the hydrogen chloride from the reaction zone being therefore realized.

To illustrate how the chlorinated acetaldehydes and their respective acetal derivatives may be produced by the process of the invention, the following examples are presented. The examples are for the purpose of illustration only and they should not be considered as limiting the invention in any way.

The apparatus used in the following examples consisted of a bulb cooler (containing 10 bulbs and 7 Berl saddles) for the cold chlorination reaction vessel and a rectifying column 2 meters high and 4.5 cm. diameter filled with Berl saddles surrounded by a steam jacket as the hot chlorination reaction chamber. At the top of the rectifying column were two consecutive bulb coolers which were connected through the open end to a gas scrubber and at the bottom of the rectifying column was a retainer kettle fitted with a discharge line.

Example I

Into the cold reaction vessel cooled to room temperature there was introduced at the top, ethyl alcohol of 96% concentration containing about 1% $FeCl_3$ at the rate of about 240 g. per hour, while chlorine gas was introduced at the bottom at a rate of about 106 g. per hour. The reaction mixture flowing from the bottom of reaction vessel was passed into the hot chlorination rectifying column which was kept at a temperature of about 90° C. by means of a steam jacket. At the bottom of the column chlorine gas was continuously introduced at a rate of about 600 g. per hour. The non-condensed vapors escaping from the top of the reflux cooler, which vapors were found to consist practically entirely of hydrogen chloride, were conducted together with the vapors emerging from the top of the cold chlorination reaction vessel into the gas scrubber where they were contacted with water in countercurrent with a view to the adsorption of the hydrogen chloride.

The reaction liquid drawn off from the bottom of the rectifying column had a specific gravity of 1.42 and was found to contain, besides unconverted alcohol and ferric chloride catalyst about 94.6% by weight of trichloroacetaldehyde hemiacetal. From the fact that practically no liquid had collected in the condenser placed behind the scrubber it appeared that there had been practically no formation of ethyl chloride or any other volatile by-products. Pure trichloroacetaldehyde hemi-acetal was obtained by a simple fractional distillation of the reaction liquid drawn off.

Example II

The chlorination was carried out in an apparatus fitted in the same way as that in Example I, with the difference, however, that between the cold reaction vessel, which was kept at a temperature ranging between 25° C. and 35° C. and the hot reaction vessel, the temperature of which ranged between 90° C. to 95° C. there was switched in an intermediate reaction vessel which was kept at a temperature ranging between 70° C. and 75° C.; this reaction vessel had the same size as the hot reaction vessel and was also filled with saddle stones.

Into the cold reaction vessel there was introduced per hour 460 g. alcohol (10 g. mol) and countercurrently thereto 285 g. chlorine (4 g. mol). The product emerging from this reaction vessel, the specific gravity of which amounted to 1.00, was passed at the top into the intermediate reaction vessel whereas at the bottom 570 g. chlorine (8 g. mol) was introduced, the product emerging from this reaction vessel at the bottom, having a specific gravity of 1.25, was subsequently chlorinated off in the third reaction vessel with 710 g. chlorine (10 g. mol) to a product with a specific gravity of 1.45. This product, which was obtained in a quantity of 940 g. per hour and consisted of about 98% by weight of trichloroacetaldehyde hemi-acetal.

Example III

The chlorination was carried out in an apparatus fitted in the same way as that in Example I. Into the cold reaction vessel there was introduced per hour about 240 g. alcohol and countercurrently thereto about 106 g. chlorine. The reaction mixture flowing from the bottom of the reaction vessel was passed into the hot chlorination rectifying column which was kept at a temperature of about 90° C. At the bottom of the column chlorine gas was continuously introduced at a rate of about 1306 g. per hour. The non-condensed vapors escaping from the top of the reflux cooler were conducted into the gas scrubber. The reaction liquid drawn off at the bottom of the column was substantially pure trichloroacetaldehyde.

We claim as our invention:

1. In a process for producing a chlorinated product of the group consisting of dichloroacetaldehyde, its hemi-acetal and acetal, and trichloroacetaldehyde, its hemi-acetal and acetal, by reacting chlorine with ethyl alcohol in the cold and then chlorinating the resulting mixture at an elevated temperature, the step of accomplishing the chlorination at the elevated temperature comprising introducing the mixture obtained from the cold chlorination at the top of a rectifying column maintained at an elevated temperature and introducing the remaining theoretical amount of chlorine at the bottom of the column at a point above the liquid level in the said column wherein the chlorine rises in the column and comes in contact for a brief period with the liquid descending from the top, immediately removing the formed hydrogen chloride at the top of the column and removing the liquid products from the bottom of the column and recovering the desired chlorinated product therefrom.

2. A continuous process for the production of a chlorinated product of the group consisting of dichloroacetaldehyde, trichloroacetaldehyde, dichloroacetaldehyde hemi-acetal, trichloroacetaldehyde hemi-acetal, dichloroacetaldehyde acetal and trichloroacetaldehyde acetal, by the chlorination of ethyl alcohol which comprises adding a small quantity of the theoretical amount of chlorine to ethyl alcohol in the cold, introducing the resulting mixture at the top of an elongated rectifying column maintained at an elevated temperature and introducing a further amount of the theoretical amount of chlorine near the bottom of the column at a point above the liquid level in the said column wherein the chlorine rises in the column and comes in contact for a brief period with the liquid descending from the top of the column, the hydrogen chloride formed by the reaction of the chlorine and liquid products rising to the top of the column and the liquid products descending to the bottom, immediately removing the hydrogen chloride at the top of the column, removing the liquid products from the bottom of the column and introducing them at the top of a second rectifying column maintained at a temperature above that used in the first column and introducing the remaining theoretical quantity of chlorine at the bottom of the column at a point above the liquid level in the column wherein the chlorine rises and is in contact with the descending liquid for a brief period, immediately removing the hydrogen chloride at the top of the second column and removing the liquid at the bottom and recovering the desired chlorinated product therefrom.

3. A continous process for producing trichloroacetaldehyde hemi-acetal which compries adding about 2 mols of chlorine to 5 mols of ethyl alcohol containing 1% to 5% by weight of a chlorination catalyst dissolved therein at a temperature between 10° C. and 35° C., introducing the resulting mixture at the top of an elongated rectifying column maintained at a temperature between 80° C. and 100° C. and introducing chlorine near the bottom of the said column at a point above the liquid level in the column at a rate sufficient to bring the alcohol and chlorine ratio to 1:2 wherein the chlorine rises in the column and comes in contact for a brief period with the liquid descending from the top of the column, the hydrogen chloride formed by the reaction of the chlorine and descending liquid rising to the top of the column and the liquid products of the reaction descending to the bottom of the said column, immediately removing the hydrogen chloride at the top of the column, and removing the liquid products from the bottom of the column and recovering therefrom the desired trichloroacetaldehyde hemi-acetal from the withdrawn liquid.

4. A continuous process for producing tricholoacetaldehyde by the chlorination of ethyl alcohol which comprises adding 10% to 20% by weight of the theoretical amount of chlorine to ethyl alcohol at a temperature between 10° C. and 35° C., introducing the resulting mixture at the top of an elongated rectifying column maintained at a temperature between 80° C. and 100° C. and introducing chlorine near the bottom of the said column at a point above the liquid level in the column at a rate sufficient to bring the alcohol and chlorine ratio to 1:4 wherein the chlorine rises in the column and comes in contact for a brief period with the liquid descending from the top of the column, the hydrogen chloride formed by the reaction of the chlorine and descending liquid rising to the top of the column and the liquid products descending to the bottom of the column, immediately removing the hydrogen chloride at the top of the column, and removing the liquid products at the bottom of the column and subsequently recovering the desired trichloroacetaldehyde therefrom.

5. The process of claim 4 wherein the chlorine is introduced at the bottom of the rectifying column in sufficient quantity to bring the ratio of alcohol and chlorine to 1:2.

6. A continuous process for the production of dichloroacetaldehyde hemi-acetal by the chlorination of ethyl alcohol which comprises adding 10% to 20% by weight of the theoretical amount of chlorine to ethyl alcohol at a temperature between 10° C. and 35° C., introducing the resulting mixture at the top of an elongated rectifying column maintained at a temperature between 80° C. and 90° C. and introducing the remaining theoretical amount of chlorine near the bottom of the said column at a point above the liquid level in the column wherein the chlorine rises in the column and comes in contact for a brief period with the liquid descending from the top of the column, the hydrogen chloride formed by the reaction of the chlorine and the descending liquid rising to the top of the column and the liquid products descending to the bottom of the column, immediately removing the hydrogen chloride at the top of the column, and removing the liquid at the bottom of the column and recovering dichloroacetaldehyde hemi-acetal therefrom.

7. A continuous process for producing trichloroacetaldehyde hemi-acetal by chlorinating ethyl alcohol which comprises adding 10% to 20% by weight of the theoretical amount of chlorine to ethyl alcohol at a temperature below 35° C., introducing the resulting mixture at the top of a rectifying column maintained at a temperature between 60° C. and 80° C. and introducing a further amount of the theoretical quantity of chlorine near the bottom of the said column at a point above the liquid level in the column wherein the chlorine rises in the column and comes in contact for a brief period with the liquid descending from the top of the column, the hydrogen chloride formed by the reaction rising to the top of the column and the liquid products descending to the bottom, immediately withdrawing the hydrogen chloride at the top of the column, withdrawing the liquid from the bottom of the column and introducing it at the top of a second rectifying column maintained at a temperature between 80° C. and 100° C., introducing the remaining theoretical amount of chlorine near the bottom of the said column at a point above the liquid level in the column wherein the chlorine rises and comes in contact with the descending liquid as in the first column, immediately removing the hydrogen chloride at the top of the second column, recovering the bottom liquid and separating therefrom the desired trichloroacetaldehyde hemi-acetal.

8. A process for producing trichloroacetaldehyde hemi-acetal by the chlorination of ethyl alcohol which comprises adding a small quantity of the theoretical amount of chlorine to ethyl alcohol at a temperature below 35° C., introducing the resulting mixture at the top of an elongated rectifying column maintained at an elevated temperature above 35° C. and introducing the remaining theoretical quantity of chlorine near the bottom of the said column at a point above the liquid level in the column wherein the chlorine rises and comes in contact for a brief period with the liquid descending from the top, the hydrogen chloride formed by the reaction of the chlorine and descending liquid rising to the top of the column and the liquid products descending to the bottom, immediately withdrawing the hydrogen chloride at the top of the column and removing the liquid at the bottom of the column and recovering therefrom the desired trichloroacetaldehyde hemi-acetal.

9. A process as defined in claim 8 wherein the temperature of the rectifying column is between 80° C. and 100° C.

10. A process as defined in claim 2 wherein the first rectifying column is maintained at a temperature between 60° C. and 80° C., and the second rectifying column is maintained at a temperature between 80° C. and 100° C.

11. A process as defined in claim 2 wherein the amount of the chlorine added to the ethyl alcohol in the cold is between .1 mol and .4 mol per mol of ethyl alcohol.

WILHELM C. BREZESINSKA SMITHUYSEN.
COENRAAD D. F. EERBEEK.

REFERENCES CITED

The following references are of record in the file of this patent:

UNITED STATES PATENTS

| Number | Name | Date |
| --- | --- | --- |
| 2,443,183 | Cass | June 15, 1948 |
| 2,468,861 | Bridge et al. | May 3, 1949 |
| 2,478,152 | Cass | Aug. 2, 1949 |
| 2,478,741 | Brothman | Aug. 9, 1949 |

OTHER REFERENCES

Groggins: "Unit Processes in Organic Synthesis," pages 192–194, McGraw-Hill, 1935.

Callahan: "Chem. & Met. Engineering," vol. 51 (October 1944), pages 112–114.